3,236,669
CELLULOSE SOLUTIONS IN DIMETHYL SULFOX-
IDE AND NITROGEN DIOXIDE
Harry D. Williams, Penns Grove, N.J., assignor to E. I.
du Pont de Nemours and Company, Wilmington, Del.,
a corporation of Delaware
No Drawing. Filed Apr. 19, 1963, Ser. No. 274,339
9 Claims. (Cl. 106—163)

The present invention provides solutions of cellulose which can be used, for example, in the manufacture of regenerated cellulose articles, and to processes for the preparation and treatment of such solutions.

The manufacture of textile fibers and transparent films from cellulosic starting materials has been a major industry for many years. The chief industrial process involves the manufacture of a cellulose derivative, cellulose xanthate, its dissolution in aqueous sodium hydroxide, aging of the solution followed by simultaneous casting into the desired physical form, i.e. fiber or film, and chemical decomposition of the xanthate ester to give regenerated cellulose. In this process a considerable quantity of carbon disulfide is used which makes no contribution to the composition of the final product. In addition, large quantities of sodium hydroxide are employed which, for reasons of economy, must be recovered for reuse, generally from dilute aqueous solution.

This invention provides solutions of cellulose which can be readily and economically prepared and converted to regenerated cellulose without the use of carbon disulfide or sodium hydroxide. The products of this invention, in addition to their outstanding suitability for the preparation of regenerated cellulose, are uniquely useful in the preparation of various cellulose derivatives such as cellulose esters.

The products of this invention are homogeneous solutions comprising cellulose, combined with about from 1.0 to 1.7 parts by weight of nitrogen dioxide per part by weight of cellulose, in dimethyl sulfoxide. The solutions of this invention can be prepared by mixing cellulose, dimethyl sulfoxide and about from 1.0 to 1.7 parts by weight of nitrogen dioxide per part by weight of cellulose until a substantially homogeneous solution is obtained. The nitrogen dioxide can be added to a slurry of the cellulose and dimethyl sulfoxide or, alternately, the nitrogen dioxide can be first added to the dimethyl sulfoxide, then the cellulose mixed therewith. The nitrogen dioxide can be added as a liquid or, alternatively, as a gas and, for example, bubbled into the reaction mixture. Preferably, liquid nitrogen dioxide is added to a slurry of the cellulose in dimethyl sulfoxide. Although the reaction can be carried out at almost any temperature and pressure at which the reaction mixture remains liquid, it is most convenient to carry out the reaction at about room temperature, e.g., 20 to 40° C.

The term "nitrogen dioxide" includes both $NO_2$ and its dimer $N_2O_4$. $NO_2$ and $N_2O_4$ exist in equilibrium, with the ratio of the two species present at atmospheric pressure depending on the temperature.

The solutions of cellulose prepared according to the present invention are clear, viscous, and homogeneous. They do not degrade rapidly in viscosity at room temperature. No evidence of uncombined $NO_2$ is seen in the solution at room temperature.

Cellulose reacts with nitrogen dioxide in dimethyl sulfoxide to form a cellulose nitrate and nitric acid according to the following equation

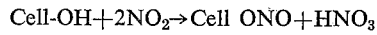
Cell-OH+$2NO_2$→Cell ONO+$HNO_3$

Dimethyl sulfoxide is known to form a complex with nitric acid thus supplying a driving force for the reaction. The formation of the nitrite ester would explain the fact that no visible evidence of $NO_2$ is seen in the solution. When the solution is diluted with water the nitrite, being unstable in aqueous media, decomposes according to the equations:

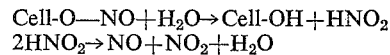
Cell-O—NO+$H_2O$→Cell-OH+$HNO_2$
$2HNO_2$→NO+$NO_2$+$H_2O$

The brown $NO_2$ fumes thus are seen on dilution with water.

The quantity of dimethyl sulfoxide employed is governed mainly by the desired viscosity of the solutions of this invention. Generally, the weight ratio of dimethyl sulfoxide to cellulose used in preparing the solutions of this invention varies from about 4:1 to 150:1 or higher. Usually, with high viscosity cotton linters, the weight ratio of dimethyl sulfoxide to cellulose is at least about 9:1, and preferably about from 15:1 to 150:1. With woodpulp, having a degree of polymerization of about 500, the weight ratio is usually at least about 4:1, and preferably about from 10:1 to 20:1. With cellulose having a degree of polymerization substantially lower than 500, lower weight ratios of dimethyl sulfoxide to cellulose can be employed, although a weight ratio of at least about 4:1 is preferred.

As previously indicated, the amount of nitrogen dioxide per part by weight of cellulose in dimethyl sulfoxide in the reaction product of this invention is about from 1.0 to 1.7 parts by weight per part by weight of cellulose. If substantially greater quantities of nitrogen dioxide are used, brown fumes are evolved from the reaction product and the viscosity thereof increases markedly. Although somewhat lesser quantities of nitrogen dioxide can be used, if substantially less than 1 part of nitrogen dioxide per part of cellulose is combined with cellulose in dimethyl sulfoxide, not all of the cellulose dissolves. Preferably, about from 1.2 to 1.5 parts by weight of nitrogen dioxide per part by weight of cellulose are reacted with the mixture of cellulose and dimethyl sulfoxide. The ingredients used in preparing the solutions of this invention preferably are substantially dry and, in this case, little or no nitrogen dioxide is consumed by reaction with water. If water is present, the quantity of nitrogen dioxide used is correspondingly increased.

Any type of purified cellulose can be dissolved to make the solutions of the present invention. Chemical wood pulp purified by the sulfate or sulfite process is suitable as is chemical wood pulp made by other processes. Cotton linters are also suitable. Cellulose which has been degraded by physical or chemical treatment also is suitable.

It is usual in the cellophane industry to age the solution of cellulose xanthate in aqueous NaOH until the proper viscosity for spinning is obtained. A similar procedure can be used for making regenerated cellulose products from the solutions of the present invention. The rate of viscosity decrease can be accelerated by increasing the temperature of the aging solution. In general, the aging temperature will be below about 60° C., however.

Precipitation of regenerated cellulose from the solutions of the instant invention is effected by dilution in a liquid medium, preferably an aqueous medium containing at least about 50% by weight of water. Naturally, the liquid must be one which does not undergo violent reaction with nitrogen dioxide. The preferred aqueous medium can contain dissolved salts such as sodium chloride, sodium sulfate, magnesium chloride, potassium sulfate, sodium nitrate, lithium nitrate, and calcium chloride, or organic liquids such as ethanol, methanol, dioxane, tetrahydrofuran, isopropanol, acetonitrile, and N-methyl pyrrolidone. Regenerated cellulose can also be precipitated from the solutions of the present invention by neutralizing the combined nitrogen dioxide in the solution with base. However, in such a process the nitrogen dioxide would not be recoverable except as a salt.

The solutions of the instant invention can also be used for conducting reactions of cellulose with various reactants. For example, cellulose esters such as cellulose acetate can be prepared by adding the anhydride of the organic acid whose cellulose ester is to be prepared, and optionally an acidic catalyst, to the solutions of cellulose, combined with nitrogen dioxide, in dimethyl sulfoxide. The preparation of cellulose acetate by this method has the advantage over the conventional method that incompletely substituted cellulose acetate, i.e. that having a degree of substitution less than 3.0, can be made having a high degree of homogeneity without the necessity for hydrolyzing completely substituted cellulose acetate as is done in the commercial cellulose acetate industry.

Other anhydrides suitable for reaction to form cellulose esters are aliphatic acid anhydrides such as propionic anhydride, butyric anhydride, stearic anhydride, succinic anhydride, lauric anhydride, and palmitic anhydride; aromatic acid anhydrides such as benzoic acid anhydride, phthalic anhydride and p-toluic anhydride; and unsaturated acid anhydrides such as crotonic anhydride and maleic anhydride. Although up to about 5 or more moles of anhydride per mole of cellulose (based on anhydroglucose units) can be used in the above reaction, in general, about a stoichiometric amount of anhydride corresponding to the degree of substitution desired is employed. Any reaction temperatures and pressures at which the reaction mixture remains liquid can be used, although about room temperature and atmospheric pressure are preferred. The optional acidic catalyst is preferably a mineral acid such as sulfuric acid and it is added in quantities less than about 10% by weight of the cellulose present.

The invention is more thoroughly illustrated by the following examples. Parts, ratios and percentages, where given, are by weight.

*Example 1*

Five parts of dry cellulose pulp (cotton linters having a degree of polymerization of about 1500) are slurried in 100 parts of dry dimethyl sulfoxide. Liquid nitrogen dioxide (six parts) is added at room temperature with stirring. The cellulose goes into solution giving a very viscous light tan solution which contains no trace of gel or fiber. No brown fumes are observed over the solution. This solution, upon storage for 3 days at room temperature, undergoes no gross reduction in viscosity. When the solution is heated to about 60° C. brown fumes are observed above the solution and the viscosity decreases. When cooled the brown fumes disappear.

When the solution is poured into water, cellulose is precipitated and brown fumes are given off. For example, when a container of the solution is emptied except for a film of solution coating the walls and the container is filled with water, a transparent cellophane bag having the shape of the container is formed. When this cellophane film is thoroughly washed with water and dried an infrared spectrum of the film is identical to that of regenerated cellulose, no evidence of carboxyl groups being observed in the infrared spectrum. A nitrogen analysis of the film indicates that substantially no nitrogen is present in the film.

*Example 2*

The procedure of Example 1 is repeated using a chemical wood pulp having a degree of polymerization of about 500. The viscosity of the clear, viscous solution is about 20,000 centipoises after standing overnight as measured in an Ostwald-Fenske, series 500 viscometer. After standing an additional day at room temperature, no noticeable decrease in viscosity occurs. After standing one week at room temperature, the viscosity is again measured and found to be 986 centipoises.

*Examples 3–6*

The procedure of Example 1 is repeated using varying quantities (shown below) of dimethyl sulfoxide, nitrogen dioxide and cellulose all giving good solutions.

| Example No. | Nitrogen Dioxide/Cellulose Ratio | Dimethyl Sulfoxide/Cellulose Ratio | Type Cellulose Used |
|---|---|---|---|
| 3 | 1.0 | 9 | Wood pulp D.P. about 400. |
| 4 | 1.7 | 50 | Cotton linters D.P. about 2,000. |
| 5 | 1.5 | 100 | Wood pulp D.P. about 700. |
| 6 | 1.2 | 4 | Wood pulp D.P. about 300. |

*Example 7*

A solution of 10 parts of wood pulp in 200 parts of dimethyl sulfoxide and 15 parts of nitrogen dioxide is made as in Example 1. Phthalic anhydride (46 parts) is added and mixed in well. This solution is allowed to stand for 72 hours at room temperature. The solution is then added to a large excess of water with stirring. A fibrous cellulosic product is obtained which, after drying, contains 2.49% phthalyl by analysis. The fibrous product is soluble in 10% aqueous NaOH.

*Example 8*

A solution containing 10 parts of chemical wood pulp, having a degree of polymerization of about 500, 200 parts of dimethyl sulfoxide and 12 parts of nitrogen dioxide is prepared as in Example 1. To thirty parts of this solution is added 3 parts of acetic anhydride and 0.5 part of concentrated sulfuric acid. This solution is stirred for 1 hour at room temperature. The cellulose acetate is then precipitated in an excess of acetone and washed thoroughly with acetone. This acetone-wet cellulose acetate is soluble in water. After drying the cellulose acetate is analyzed and found to contain 11.6% acetyl ($CH_3CO$).

I claim:

1. A homogeneous solution consisting essentially of cellulose, combined with about from 1.0 to 1.7 parts by weight of nitrogen dioxide per part by weight of cellulose, in at least 4 parts of dimethyl sulfoxide per part cellulose.

2. The product of claim 1 wherein the combined nitrogen dioxide ranges about from 1.2 to 1.5 parts by weight per part by weight of cellulose.

3. A process which comprises mixing cellulose with at least 4 parts dimethyl sulfoxide per part cellulose and adding thereto about from 1.0 to 1.7 parts by weight of nitrogen dioxide per part by weight of cellulose and mixing until a substantially homogeneous solution is obtained.

4. A process of claim 3 which comprises diluting said solution with an aqueous medium to regenerate the cellulose.

5. A process for making regenerated cellulose articles which comprises mixing substantially dry cellulose with at least 4 parts dimethyl sulfoxide per part cellulose and adding thereto about from 1.0 to 1.7 parts by weight of nitrogen dioxide per part by weight of cellulose and mixing until a substantially homogeneous solution is obtained, aging said solution, and precipitating regenerated cellulose from said aged solution by diluting it with water.

6. A process of claim 3 wherein the anhydride of an organic acid is added to said solution to esterify cellulose therein.

7. The process of claim 6 wherein the anhydride is acetic anhydride.

8. The process of claim 6 wherein the anhydride is phthalic anhydride.

9. A process of claim 6 wherein said esterification is carried out in the presence of an acidic catalyst.

References Cited by the Examiner

UNITED STATES PATENTS 3,023,183   2/1962   Nelson _____ 106—311

OTHER REFERENCES

Fowler et al., J. Am. Chem. Soc., vol. 69, pages 1636–1640, 1957.

Kharasch, "Organic Sulfur Compounds," vol. 1, pages 176 and 177, 1961.

Ott et al., "High Polymers," vol. V, part III, page 1081, 2d edition, 1955.

Stepan, Chem. Eng. News, Sept. 19, 1955, page 3933.

MORRIS LIEBMAN, *Primary Examiner*.